Patented Aug. 29, 1933

1,924,514

UNITED STATES PATENT OFFICE 1,924,514

PHENOLIC CONDENSATION PRODUCT AND PROCESS OF PRODUCING SAME

Lawrence V. Redman and Archie J. Weith, Caldwell, N. J., and Frank P. Brock, Hinsdale, Ill., assignors to Bakelite Corporation, New York, N. Y., a corporation of Delaware No Drawing. Application July 14, 1927
Serial No. 205,837

4 Claims. (Cl. 260—4)

In a copending application, Serial No. 471,918 filed May 23, 1921, now Patent 1,811,808, we have disclosed an improved molding compound and a process of making the same, the said process comprising in its preferred embodiment, the preparation of a non-reactive phenol resin containing free phenol; the treatment of the said resin with calcium hydroxid or equivalent base in substantially the proportion required to convert the free phenol into the corresponding phenolate; and the incorporation with the resulting resinous composition of sufficient hexamethylenetetramine or equivalent hardening agent having aldehyde characteristics to render the same potentially reactive, together with appropriate filling materials.

According to the present invention a further improvement in molding mixtures of this general type is effected by employing the calcium hydroxid or equivalent base in proportion to combine not merely with the free phenols which may be present, as in the prior application above referred to, but with the hydroxyl component of the resin itself; and subjecting the mixture of resin and base to a treatment which will bring about a chemical combination between the two. Our present process is applicable therefore to resins irrespective of the presence or absence therein of free phenol; the proportion of lime or other basic addition being calculated in correspondence with the hydroxyl content of the resin and of any free phenol which may be present.

As more fully pointed out hereinafter, our present invention is applicable also to the treatment of other resinous or resin-like bodies, including rosin and other natural resins, and casein, when these are used in conjunction with or as additions to the phenol resins.

In the practice of our invention according to a preferred embodiment thereof, we first prepare in accordance with known methods, a non-reactive phenol resin; that is to say a phenol resin of the so-called permanently fusible and soluble type which may be maintained indefinitely in fusion at or near its melting point without passing over to the infusible and insoluble state. Such a resin is conveniently prepared by reacting with at least thirteen mols of phenol (which term is used herein to include phenol proper and its homologs) upon twelve mols of methylene, in the form either of formaldehyde or of hexamethylenetetramine. As a rule some excess of phenol is used, and the non-reactive resin which results contains this free phenol, a part or even all of which may if desired be removed by steam distillation, washing with water, or other appropriate method.

We then incorporate thoroughly with this resin a quantity of calcium hydroxid molecularly equivalent to its content, if any, of free phenol, together with an additional amount which is preferably substantially molecularly equivalent to the hydroxyl content of the resin itself. For example, if we prepare a resinous condensation product by reacting with twelve methylenes (two mols of hexamethylenetetramine or twelve mols of formaldehyde) upon sixteen mols of phenol, we regard the resin itself, for the purposes of this invention, as being a reaction product of the twelve methylene groups with thirteen phenolic groups: and therefore as containing three uncombined phenolic groups. In such case, (assuming that none of the free phenol has been removed by washing or otherwise) the lime addition will be calculated to correspond to four mols of phenol. In case any portion of the free phenol has been eliminated, the proportion of lime is correspondingly reduced.

Thereafter the mixture is subjected to sufficient heat to effect the desired chemical reaction between the lime and the hydroxyl groups, including the hydroxyl of the resin. For this purpose we have found it sufficient to heat the mixture to about 175° C. for two to three hours with constant stirring; although our invention is not limited to these particular conditions, since for instance, a lower temperature may be applied for a longer period, or higher temperatures for a shorter period, time and temperature being in this case co-relative factors to some extent. During this treatment considerable amounts of water are set free and eliminated. It will of course be understood that this treatment is applicable only to non-reactive or very slowly reactive resins, since highly reactive resins would be transformed during this intensive treatment to the infusible (resinoid) modification. When reference is made herein to "non-reactive resins", it is intended to include all such as are of sufficient low reactivity to withstand the above heat-treatment without passing over to the resinoid state. The resulting product will be referred to for convenience simply as the "limed resin", it being understood that certain other basic bodies, including the hydroxids of barium, strontium and magnesium, and ferric and chromic hydroxids, may replace lime wholly or in part in this reaction and to that extent are equivalent thereto.

In the practice of the invention we prefer to calculate the lime addition as substantially equivalent to the hydroxyl of the resin, over and above the quantity equivalent to any free phenol present. A somewhat less porportion of lime may however be used with good results, although we have found that the optimum conditions as regards the molding characteristics of the compound is attained when the full proportion of lime as above indicated is used. On the other hand it is important that no considerable excess of lime above this optimum proportion should be employed. Among the effects of the basic addition (hereinafter simply referred to as "lime") are to improve the plastic quality of the molding mixture and to overcome any tendency to stick to the mold, with resulting injury to the surface of the molded article. These effects are obtained in increasing measure up to the optimum point indicated above, that is to say to the point of complete neutralization of the hydroxyl component of the resin; but it is a remarkable fact that proportions of lime in substantial excess of this amount increase the tendency to stick to the mold, and likewise tend to injure the plastic qualities of the mixture.

The product formed in the manner above described is a non-reactive limed resin. For the preparation of a molding mixture it is necessary to incorporate with it appropriate fillers, usually of a fibrous nature, such as wood flour, asbestos or the like, and to impart to it a potentially reactive character. This last is effected in the manner now well understood in the art, by incorporating a suitable hardening agent having an aldehyde character. We prefer in most cases to employ for this purpose hexamethylenetetramine, in about the proportion to provide, in the mixture as a whole, equimolecular porportions of phenol and methylene groups. That is, in the specific illustrative instance given above in which the initial reaction was brought about between sixteen molecular weights of phenol, and twelve molecular weights of methylene, we prefer to add approximately four methylene groups as the hardening admixture. The entrance of the base into the molecule does not materially alter the methylene requirements for imparting to the limed resin the desired potentially reactive character.

Instead of hexamethylenetetramine or formaldehyde we may substitute wholly or in part other hardening agents having an aldehyde character, such as furfural, anhydro-formaldehyde-aniline, and the like. Suitable plasticizing agents, including furfural, may of course be added to the potentially reactive molding composition without departure from our invention.

Additions of the nature of resin or other natural resins, casein, and the like which are capable of entering into combination with lime or its equivalents may also be used; and in such cases we preferably proportion the lime addition to neutralize such substances. In case of plasticizing or other additions not forming chemical combinations with the alkalies such adjustment need not of course be made.

In our prior application above referred to the basic addition is used in proportion up to that required to combine with the free phenol present in the resin. According to the present invention we employ the basic material in substantially higher proportion, and preferably in amount substantially sufficient to neutralize the hydroxyl of the resin itself, in addition to neutralizing free phenol if present.

Reactive resins prepared in accordance with this invention may be incorporated with fibrous or other fillers in any desired proportion, within unusually wide limits. The mixtures prepared with high resin content, (around 60% of resin) are highly resistant to water, but are nevertheless of the rapid-molding type and may be discharged hot from the molds, a combination of properties which is very difficult of attainment in commercial molding mixtures.

We claim:

1. In a process of making a potentially reactive molding mixture, the step comprising effecting a reaction between a non-reactive phenol resin and an inorganic base under substantially anhydrous conditions, the base in sufficient amount to neutralize a substantial proportion of the hydroxyl of the resin.

2. In a process of making a potentially reactive molding mixture, the step comprising effecting a reaction between a non-reactive phenol resin and lime under substantially anhydrous conditions, the lime in sufficient amount to neutralize a substantial proportion of the hydroxyl of the resin.

3. Process of making a potentially reactive molding mixture which comprises effecting a reaction between a non-reactive phenol resin and an inorganic base, the base in amount equivalent to a substantial proportion of the hydroxyl of the resin, in the presence of an amount of water insufficient to dissolve a substantial amount of the resin under the conditions of the reaction and compounding therewith a filling material and a hardening agent capable of imparting to the mixture a potentially reactive character.

4. Process of making a potentially reactive molding mixture which comprises effecting a reaction between a non-reactive phenol resin and lime, the lime in amount equivalent to a substantial proportion of the hydroxyl of the resin, in the presence of an amount of water insufficient to dissolve a substantial amount of the resin under the conditions of the reaction and compounding therewith a filling material and a hardening agent capable of imparting to the mixture a potentially reactive character.

LAWRENCE V. REDMAN.
ARCHIE J. WEITH.
FRANK P. BROCK.